C. L. VANDERVORT, O. J. PITT & C. F. VANDERVORT.
AUTOMOBILE TIRE.
APPLICATION FILED AUG. 31, 1910.
983,008.
Patented Jan. 31, 1911.
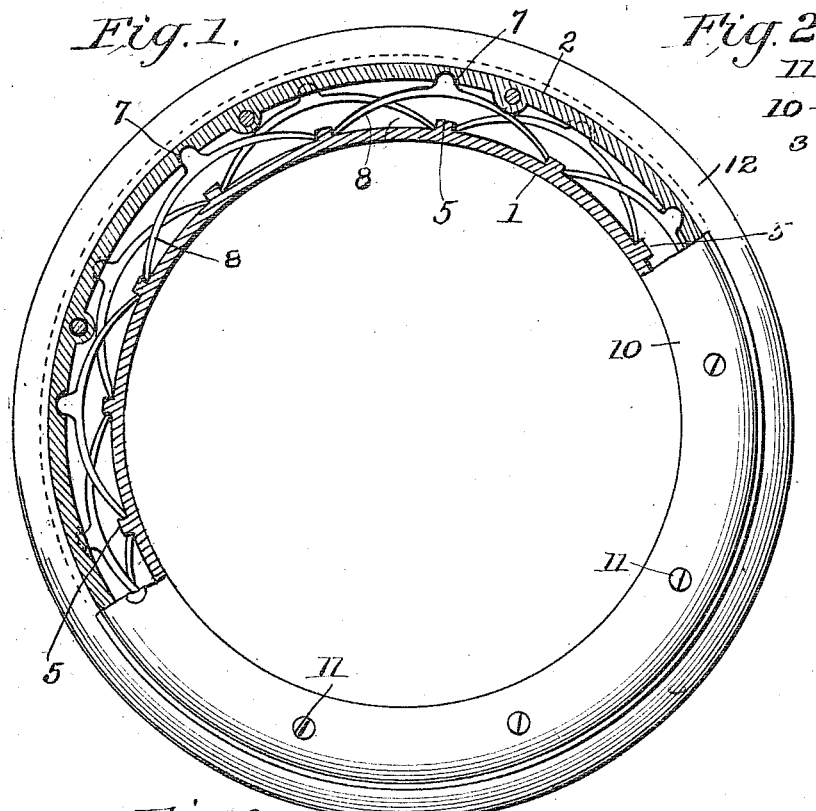
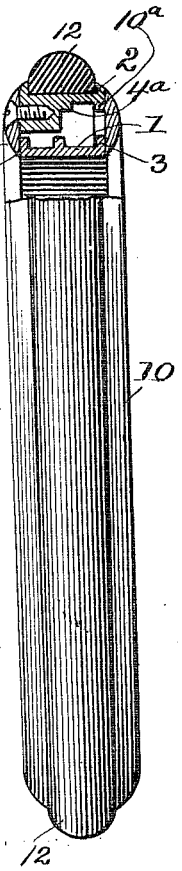
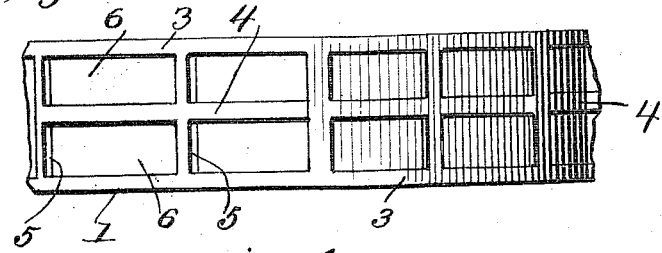
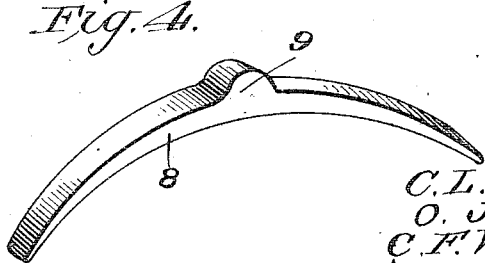
Witnesses
Inventors
C. L. Vandervort
O. J. Pitt
C. F. Vandervort
By
Attorneys

UNITED STATES PATENT OFFICE.

CHARLES L. VANDERVORT, OTTO J. PITT, AND CHARLES F. VANDERVORT, OF ENDERLIN, NORTH DAKOTA.

AUTOMOBILE-TIRE.

983,008.  Specification of Letters Patent.  Patented Jan. 31, 1911.

Application filed August 31, 1910. Serial No. 579,908.

*To all whom it may concern:*

Be it known that we, CHARLES L. VANDERVORT, OTTO J. PITT, and CHARLES F. VANDERVORT, citizens of the United States, residing at Enderlin, in the county of Ransom and State of North Dakota, have invented certain new and useful Improvements in Automobile-Tires, of which the following is a specification.

This invention comprehends certain new and useful improvements in resilient wheels and tires for automobiles, motor trucks and other vehicles, and the invention has for its primary object a simple, durable and efficient construction of tire which will embody to a marked degree the requisite characteristics of resiliency without being open to the manifest objections incidental to the use of tires of the pneumatic type.

With these and other objects in view as will more fully appear as the description proceeds, the invention consists in certain constructions, arrangements and combinations of the parts that we shall hereinafter fully describe and claim.

For a full understanding of the invention, reference is to be had to the following description and accompanying drawings in which:

Figure 1 is a side elevation of a tire constructed in accordance with our invention, a part of one of the retaining rings being broken away; Fig. 2 is an edge view of the tire partly in section; Fig. 3 is a fragmentary view of the periphery of the inner rim; and, Fig. 4 is a detail perspective view of one of the springs employed.

Corresponding and like parts are referred to in the following description and indicated in all the views of the accompanying drawings by the same reference characters.

Our improved tire comprises an inner rim 1 and an outer rim 2 of metal or any other desired substance or material, said rims being concentric one to the other, in spaced relation to each other, and the inner rim being designed for attachment to the felly of a wheel in any desired way. The inner rim 1 is formed with outstanding and radially projecting circumferential side flanges 3 and with an intermediate circumferential rib 4 which is intersected by any desired number of transversely extending ribs 5, whereby the periphery of the inner rim 1 is divided into two sets of circumferentially extending segmental slots 6.

The outer rim 2 is formed with an intermediate circumferentially extending rib $4^a$ arranged in axial coincidence with the rib 4 and with a plurality of sockets 7 each one of which is set preferably midway the two adjacent transverse ribs 5 of the rim 1. It will thus be understood that the sockets 7 are arranged in two series in the inner face of the rim 2 and on opposite sides of the inwardly projecting circumferential flange $4^a$ of said rim.

Bowed springs 8 are interposed between the inner and outer rims 1 and 2, said springs being of any desired number, according to the number of segmental slots 6 and corresponding sockets 7, the said springs being formed of any desired metal and being arranged so that their ends will project inwardly and ride in the slots 6 and abut under flexion against the transverse ribs 5. These springs are respectively formed with nibs or lugs 9 intermediate of their ends, the said lugs being received in the respective sockets 7 of the outer rim 2. Manifestly there are two sets of these springs 8 one set on each side of the ribs 4, $4^a$.

To retain the parts together as against sidewise strain and displacement, we have provided side retaining rings 10 which are secured against the opposite sides of the inner and outer rims 1 and 2, in any desired way as by screws 11 or similar fastening devices working in bosses formed in the outer rim 2, the inner edges of the rings overlapping the side edges of the inner rim 1. If desired, the outer rim 2 may be channeled as shown so as to receive a metal, wooden, or rubber tread element 12, although it is to be understood that our invention is not limited to this construction and arrangement of parts, or to the use of rubber at all, as we do not depend upon rubber to secure the desired resiliency. Preferably the side rings 10 are formed with inwardly extending annular flanges $10^a$ fitting within the outer rim 2 and preferably of a width substantially equal to the width of the opposing flanges 3 of the inner rim 1.

From the foregoing description in connection with the accompanying drawing, the operation of our improved resilient tire will be apparent. In the practical use of the device, it is obvious that the outer rim 2 will be permitted to yield to secure the desired resiliency, as it is supported in spaced relation from the inner rim 1 by arched or bowed springs 8. It is evident that the parts may be easily made, and may be readily assembled, it being possible to easily slip the springs 8 into place with their lugs 9 seated in the sockets 7 and their ends bearing against the bottom walls of the segmental slots or channels 6. Then after the side rings are secured in place, the rim is complete and ready for attachment to the felly of a vehicle wheel.

Preferably, as clearly illustrated in the drawings, the springs of one set break joint with the springs of the other set, the transverse ribs being therefore duplicated for this purpose.

Having thus described the invention, what is claimed as new is:

1. A tire of the character described, comprising inner and outer concentric rims arranged in spaced relation to each other, the inner rim being formed with circumferential side flanges and a circumferential intermediate rib spaced from said flanges and with a plurality of transversely extending ribs intersecting the circumferential rib and dividing the periphery of said rim into two sets of circumferentially extending slots, the outer rim being formed on its inner face with a circumferential rib set opposite the intermediate rib of the inner rim, and bowed springs interposed between said rims on opposite sides of the intermediate ribs thereof and bearing against said rims, the ends of the springs working in the slots of the inner rim and adapted to abut against the transverse ribs thereof.

2. A tire of the character described, comprising inner and outer concentric rims, arranged in spaced relation to each other, the inner rim being formed with circumferential side flanges and a circumferential intermediate rib spaced from said flanges and with a plurality of transversely extending ribs intersecting the circumferential rib and dividing the periphery of said rim into two sets of circumferentially extending slots, the outer rim being formed on its inner face with a circumferential rib set opposite the intermediate rib of the inner rim, bowed springs interposed between said rims on opposite sides of the intermediate ribs thereof and bearing against said rims, the ends of the springs working in the slots of the inner rim and adapted to abut against the transverse ribs thereof, and retaining rings secured to the opposite sides of said rims, the rings being formed with inwardly extending annular flanges fitting within the outer rim.

In testimony whereof, we affix our signatures in presence of two witnesses.

CHARLES L. VANDERVORT. [L. S.]
  OTTO J. PITT. [L. S.]
  CHARLES F. VANDERVORT. [L. S.]

Witnesses:
 FRED UNDERWOOD,
 JOE S. UNDERWOOD.